United States Patent
Reehil et al.

(10) Patent No.: US 11,436,248 B2
(45) Date of Patent: Sep. 6, 2022

(54) SYSTEMS AND METHODS FOR PROVIDING DYNAMICALLY CONFIGURED RESPONSIVE STORAGE

(71) Applicant: AT&T Intellectual Property I, L.P., Atlanta, GA (US)

(72) Inventors: William Reehil, Eatontown, NJ (US); Robby Maharajh, S. Richmond Hill, NY (US); William Lamont, Tinton Falls, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 258 days.

(21) Appl. No.: 16/228,533

(22) Filed: Dec. 20, 2018

(65) Prior Publication Data
US 2020/0201874 A1 Jun. 25, 2020

(51) Int. Cl.
| G06F 16/00 | (2019.01) |
| G06F 16/25 | (2019.01) |
| G06F 16/28 | (2019.01) |
| G06F 9/455 | (2018.01) |
| G06F 9/451 | (2018.01) |

(52) U.S. Cl.
CPC ............ *G06F 16/254* (2019.01); *G06F 9/451* (2018.02); *G06F 9/45529* (2013.01); *G06F 16/284* (2019.01); *G06F 9/45558* (2013.01); *G06F 2009/45595* (2013.01)

(58) Field of Classification Search
None
See application file for complete search history.

(56) References Cited

U.S. PATENT DOCUMENTS

| 8,914,314 | B2 * | 12/2014 | Newnham | G06N 5/04 706/12 |
| 9,558,020 | B2 | 1/2017 | Feng et al. | |
| 9,646,092 | B2 | 5/2017 | Cooper et al. | |
| 9,875,121 | B2 * | 1/2018 | Roth | G06F 9/466 |
| 9,959,363 | B2 | 5/2018 | Kaplinger et al. | |
| 10,726,359 | B1 * | 7/2020 | Drouin | G16H 10/60 |
| 10,826,798 | B2 * | 11/2020 | Takla | H04L 41/0853 |
| 10,863,387 | B2 * | 12/2020 | Alex | H04L 41/5025 |
| 2005/0216524 | A1 * | 9/2005 | Gomes | G06F 16/273 |

(Continued)

FOREIGN PATENT DOCUMENTS

| CN | 103514026 A | 1/2014 |
| JP | 4889813 B1 | 3/2012 |
| KR | 10-1568654 B1 | 11/2015 |

OTHER PUBLICATIONS

Managing Data in Computational Edge Clouds, Mohan et al., (Year: 2017).*

*Primary Examiner* — Jean M Corrielus
(74) *Attorney, Agent, or Firm* — Guntin & Gust, PLC; Ralph Trementozzi

(57) ABSTRACT

Storage systems and method to store data, from a data source, which is responsive to one or more requests from at least one data consumer. A data store is configured to cache at least some data from the data source. A data management component is configured to store the at least some data in the data store based on at least one criteria of the data consumer. At least one criteria is identified based on the one or more requests. Data is stored in the at least some data from the data source in response to the identifying the at least one criteria.

20 Claims, 9 Drawing Sheets

(56) References Cited

U.S. PATENT DOCUMENTS

| | | | |
|---|---|---|---|
| 2007/0219936 A1* | 9/2007 | Arulambalam | G11B 20/10 |
| 2013/0080358 A1* | 3/2013 | Newnham | G06N 5/02 |
| | | | 706/12 |
| 2013/0110750 A1* | 5/2013 | Newnham | G06N 5/04 |
| | | | 706/12 |
| 2016/0085576 A1* | 3/2016 | Chastain | G06F 9/45533 |
| | | | 718/1 |
| 2016/0149774 A1* | 5/2016 | Chastain | H04L 43/028 |
| | | | 370/241 |
| 2016/0299830 A1* | 10/2016 | Chastain | G06F 9/45558 |
| 2016/0373543 A1 | 12/2016 | Alla | |
| 2017/0048200 A1* | 2/2017 | Chastain | H04L 63/0272 |
| 2018/0018590 A1* | 1/2018 | Szeto | G06F 21/6254 |
| 2018/0173812 A1* | 6/2018 | Agarwal | G06F 16/254 |
| 2019/0042286 A1* | 2/2019 | Bailey | G06F 9/455 |
| 2019/0042289 A1* | 2/2019 | Bailey | G06F 8/60 |
| 2019/0042290 A1* | 2/2019 | Bailey | G06F 8/51 |
| 2020/0204463 A1* | 6/2020 | Guan | H04L 67/20 |

\* cited by examiner

SYSTEMS AND METHODS FOR PROVIDING DYNAMICALLY CONFIGURED RESPONSIVE STORAGE

TECHNICAL FIELD

This disclosure generally relates to data storage and retrieval, and more particularly to, techniques for populating and updating caches in support of data storage and retrieval.

BACKGROUND

The use of large and complex data sets (often referred to as "big data") has produced many benefits. Big data enables organizations and individuals to understand the past, analyze the present, and predict the future. For instance, network operators and network service providers can use big data to (i) understand how their networks have performed in the past, (ii) identify how their networks are performing in the present, (iii) predict how their networks may perform in the future, and (iv) solve problems related to the foregoing. By deploying big data efficiently, network operators and providers can correct problems that cause a degradation in performance, expand capacity in certain areas, and perform preventive maintenance. Utilization of big data is of course not limited to network providers and operators. Businesses can use big data to manage supply chains and production and identify business trends and opportunities. For such use of big data to be effective, however, it is important that consumers of big data can store and retrieve it in an efficient way and with confidence that the data is valid and not stale.

A problem exists, however, in that retrieval of big data may be limited by the interface(s) that are used to retrieve the data. For instance, a server executing calls against a big data source may encounter bottlenecks due to the sheer volume of the data and the logic required to extract the data from the data source. In addition, a large volume of calls may also cause a bottleneck due to the time it takes to execute each call. Accordingly, what is needed are more efficient processes for storing and retrieving big data while maintaining the integrity of the data for its intended use.

SUMMARY

In one embodiment, a storage system configured to store data, from a data source, which is responsive to one or more requests from at least one data consumer is provided. A data store is configured to cache at least some data from the data source. A data management component is configured to store the at least some data in the data store based on at least one criteria of the data consumer. The data management component includes a processor, an input/output device coupled to the processor, and a memory coupled with the processor. The memory comprises executable instructions that when executed by the processor cause the processor to effectuate operations. At least one criteria is identified based on the one or more requests. At least some data from the data source is stored in response to the identifying the at least one criteria.

In one embodiment, a method to store data, from a data source, which is responsive to one or more requests from at least one data consumer is provided. At least some data from the data source is cached. A data management component is employed that is configured to store the at least some data in the data store based on at least one criteria of the data consumer. The data management component is configured to identify the at least one criteria based on the one or more requests and store the at least some data from the data source in response to the identifying the at least one criteria.

In one embodiment, the data store comprises at least one cache memory device that stores one or more java script objection notation (JSON) responses that mirror the at least some data from the data store. In one embodiment, the JSON responses are selected by the data management component for inclusion in the data store. In one embodiment, the at least one criteria comprises an update frequency parameter for the data. In one embodiment, the management component determines the update frequency parameter based upon at least one of time sensitivity of the at least some data and accuracy of the at least some data. In one embodiment, the management component determines the update frequency parameter through analyzing one or more requests received from the at least one data consumer. In one embodiment, the management component determines the update frequency parameter through receipt of instructions from the at least one data consumer. In one embodiment, the data store comprises at least one portion of an enhanced control, orchestration, management and policy (ECOMP) platform attached to a managed network. In one embodiment, the at least one portion comprises an A&AI module. In one embodiment, the data store is updated through utilization of one or more DMaaP updates.

BRIEF DESCRIPTION OF THE DRAWINGS

In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

Figure 1A:
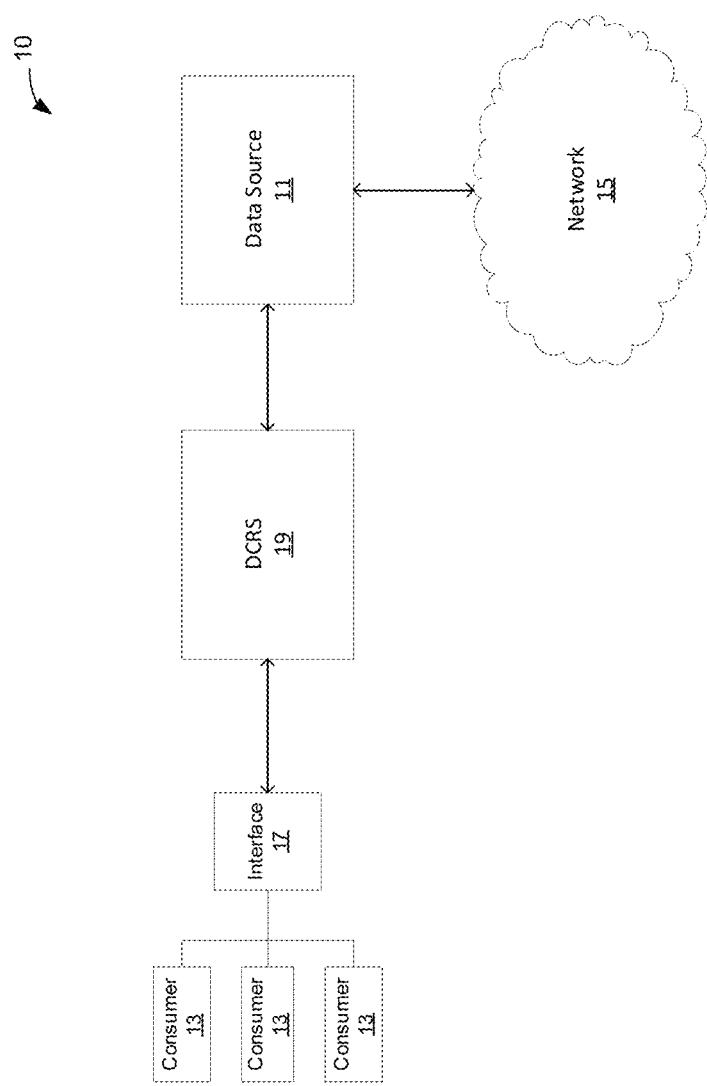
FIG. 1A is an illustrative embodiment of a system including one example of a dynamically configured responsive storage (DCRS) component.

Referring to FIG. 1A, in one embodiment, a system 10 comprises at least one data source 11, one or more data consumers 13, a network 15, at least one interface 17, and a dynamically configured responsive storage (DCRS) component 19. A discussion of each component will be provided with the understanding that the components of system 10 are provided for illustrative purposes only. The components of system 10 may be combined or divided. In addition, components of system 10 may be removed from system 10 or certain other components, not recited herein, may be added to system 10. Such modifications may occur without departing from the scope of the present disclosure. It should be understood that system 10 may comprise physical or logical entities that are implemented through the use of hardware and/or software, which may be concentrated in one or a small number of locations or distributed over one or more networks. Descriptions of exemplary computing and network devices are proved with reference to FIGS. 3-5 herein.

Referring further to FIG. 1A, data source 11 in one example is a repository of data from which consumers 13 wish to interact through data storage or retrieval. Consumers 13 may be individual entities operating one or more computing devices through which they interact with data source 11 or they may be processes or functionality operating on one or more computing devices without individual interaction.

Data source 11 may reside on one or more networks 15. In one embodiment, data store 11 may be a public and/or private repository of data maintained, controlled, or accumulated by one or more entities operating on network 15. Data source 11 may be concentrated on one data storage device or it may be distributed over multiple data storage devices. Data source 11 in one example may include multiple types of information of interest to consumers. In one example, network 15 may be a managed network that is operated by a network provider. Accordingly, data source 11 may include network configuration, status, and diagnostic information about network 15. Consumers 13 may be administrative users or processes, which are tasked with operating and maintaining network 15. A further description of such a data source 11 will be provided further herein.

Interfaces 17 provide mechanisms through which consumers 13 may request and receive data from data source 11. Interfaces 19 may be physical interfaces or software defined interfaces, such as an API. Interfaces 19 may operate on one or more computing devices, such as DCRS 19.

DCRS 19 in one example includes one or more data storage devices that are configurable by one or more management components to dynamically store data from data source 11. DCRS 19 in one example stores data from data source 11 in such a manner that consumers 13 can store, retrieve, and deleted data from data source 11 faster than if consumer 13 interacted directly with data source 11. DCRS 19 in one example retrieves data from data source 11 and stores data for consumption by consumers 13. DCRS 19 may maintain the data that it stores from data source 11 in accordance with the requirements of consumers 13. For example, if consumers 13 do not need access to real time data from data source 11 and/or if data source 11 does not change often, then DCRS 19 may retrieve and update data from data source 11 in accordance with a schedule. For instance, DCRS 19 may update data at the beginning of a time period (hour, day, week, etc.) or after expiration of an interval. In another example, DCRS 19 may update data in accordance with a forced update by an administrator or network function. In another example, data may be updated on DCRS 19 as it changes in data source 11. It should be noted that all data in DCRS does not have to be treated the same. Some types of data may be updated in one manner while other types of data are updated in another manner. Furthermore, not all data from data source 11 may be stored on DCRS 19. For example, DCRS 19 may be configured to only store data from data source 11 that is subject to a certain level of demand from consumers 13. If certain types of data do not reach such levels of demand, DCRS 19 may instruction consumers 13 to bypass DCRS 19 and retrieve such data directly from data source 11.

Figure 1B:
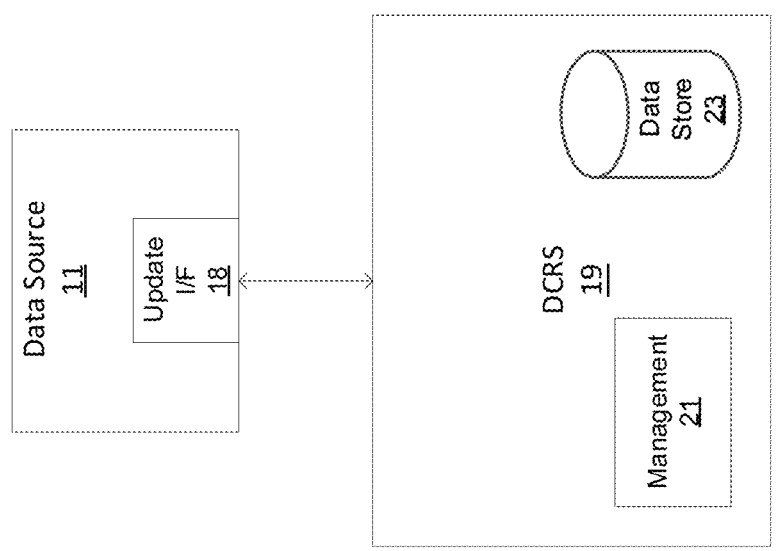
FIG. 1B is an illustrative embodiment of one example of a management structure of the DCRS of FIG. 1A.

Referring to FIG. 1B, an exemplary description of data source 11 and DCRS 19 are provided for illustrative purposes. In one embodiment, data source 11 may include an update interface 18 through which data is sent to DCRS 19 in accordance with the update mechanisms described herein. DCRS 19 in one example may include management component 21 and a data store 23. Management component 21 provides the mechanisms by which DCRS 19 is updated with data from data source 11. Management component 21 may include an administrative interface for manual management, machine learning or artificial intelligence components for automated management, and the functional components needed to get data from data source 11, store data on DCRS 19, update data on DRS 19, and delete data from DCRS 19.

Referring further to FIG. 1B, DCRS 19 in one example includes one or more instances of data store 23. Data store 23 in one embodiment are one or more data storage devices on which DCRS 19 stores data from data sources 11. In one example, data store 23 comprises one or more high speed cache devices. Management component 21 provides functionality through which administrators or processers governing DCRS 19 may create cache keys defining the parameters by which data from data source 11 is stored in data store 23. It should be noted that FIG. 1B depicts, for illustrative purposes, DCRS 19 as a component encapsulating management component 21 and data store 23. However, the functionality management component 21 and data store 23 could be distributed over one or more devices and/or networks.

Figure 1C:
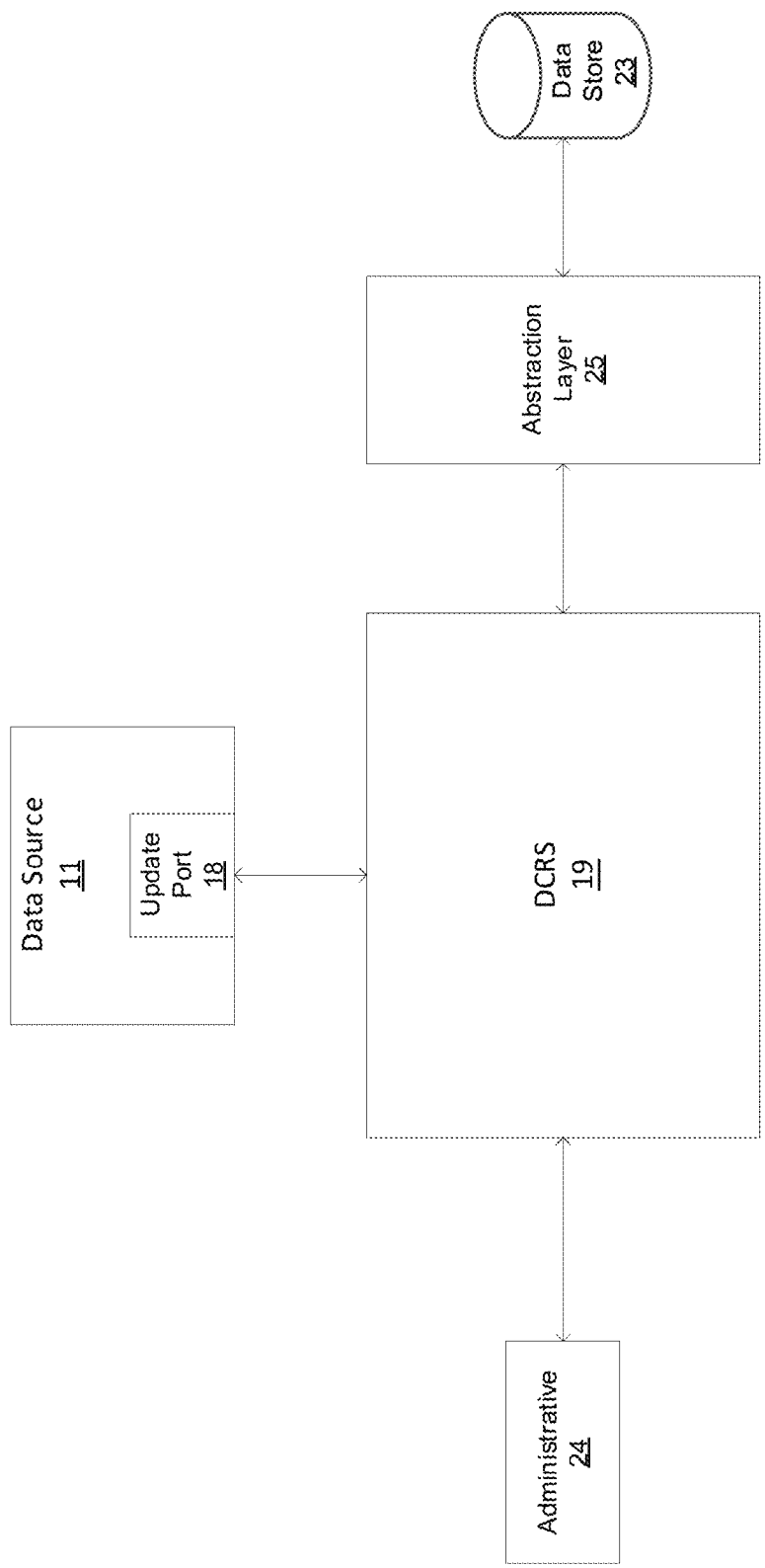
FIG. 1C is an illustrative embodiment of one example of a management structure of the DCRS of FIG. 1A.

Referring to FIG. 1C, in one embodiment, management component 21 and data store 23 may be configured in multiple ways. In one example, management component 21 may include an administrative portal 24 and an abstraction layer 25. Administrative portal 24 may provide an interface through which a user and entity may configure data storage on data store. For example, a user may specific the parameters such as the location of data, the frequency at which data is updated, the type of data that is updated, how data is updated, and when data is updated based on certain system events or occurrences. In one example, management component 21 may include an abstraction layer 25 through which DCRS 19 interacts with data store 23. Abstraction layer 25 in one example may provide interface functionality for various components entities to maintain data store 23. For example, abstraction layer 25 may include machine learning and/or artificial intelligence components to read, write, update, and delete data from data stores 23 based on activity occurring on data source 11 and/or network 15.

Figure 2A:
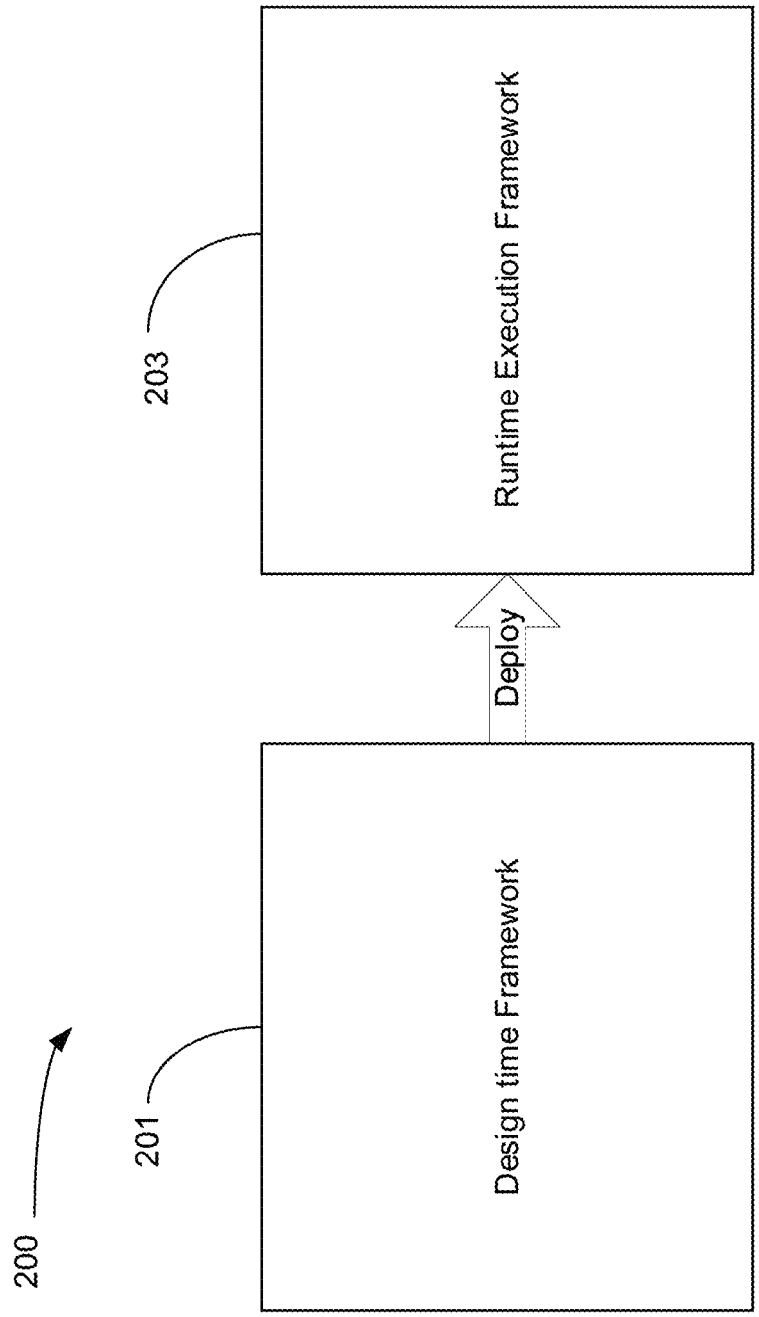
FIG. 2A is a functional block representation of an enhanced control, orchestration, management and policy (ECOMP) platform 200 for use with the system of FIG. 1A.

Referring to FIG. 2A, a detailed description of an architecture of an enhanced control, orchestration, management and policy platform, (ECOMP platform 200) that is implemented in a cloud environment is provided for illustrative purposes. ECOMP platform 200 in one embodiment includes data that is of interest and use to data consumers who utilize ECOMP platform 200 to manage one or more networks. Accordingly, data source 11 of FIGS. 1A-1C may comprise one or more components of ECOMP platform 200.

ECOMP platform 200 includes a design time framework component 201 and a runtime execution framework 203. The cloud environment provides a number of capabilities including real-time instantiation of virtual machines (VMs) on commercial hardware where appropriate; dynamic assignment of application and workloads to VMs; dynamic movement of applications and dependent functions to different VMs on servers within and across data centers in different geographies (within the limits of physical access tiedowns constraints); and dynamic control of resources made available to applications (CPU, memory, storage). With the use of network function virtualization, network appliances have been transformed into software applications. In the integrated cloud environment, the dynamic cloud capabilities are applied to applications—i.e., virtual network functions (VNFs)—thus applying the benefits of the cloud environment to virtual network elements. For example, VNFs, such as routers, switches, firewalls, can be "spun up" on commodity hardware, moved from one data center to another center dynamically (within the limits of physical access tie-down constraints) and resources such as CPU, memory and storage can be dynamically controlled.

The ECOMP platform 200 enables the rapid on-boarding of new services and the reduction of operating expenses and capital expenses through its metadata-driven service design and creation platform and its real-time operational management framework—a framework that provides real-time, policy driven automation of management functions. The metadata-driven service design and creation capabilities enable services to be defined with minimal information technology development required thus contributing to reductions in capital expenses. Real-time operational management framework provide significant automation of network management functions enabling the detection and correction of problems in an automated fashion contributing to reductions in operating expenses.

The ECOMP platform 200 enables product/service independent capabilities for design, creation and lifecycle management. The design time framework component 201 is an integrated development environment with tools, techniques, and repositories for defining/describing network assets. The design time framework component 201 facilitates re-use models thus improving efficiency as more models are available for reuse. Assets include models of the cloud environment resources, services and products. The models include various process specifications and policies (e.g., rule sets) for controlling behavior and process execution. Process specifications are used by the ECOMP platform 200 to automatically sequence the instantiation, delivery and lifecycle management aspects of the integrated cloud environment-based resources, services, products and the components of the ECOMP platform 200. The design time framework component 201 supports the development of new capabilities, augmentation of existing capabilities and operational improvements throughout the lifecycle of a service. Service design and creation (SDC), policy, and data collection, analytics and events (DCAE) software development kits (SDKs) allow operations/security, 3rd parties (e.g., vendors), and other experts to continually define/refine new collection, analytics, and policies (including recipes for corrective/remedial action) using a design framework portal. Certain process specifications (aka 'recipes') and policies are geographically distributed to many points of use to optimize performance and maximize autonomous behavior in integrated cloud environment's federated cloud environment.

The runtime execution framework 203 executes the rules and policies distributed by a design and creation environment. This allows for the distribution of policy enforcement and templates among various ECOMP modules (described below). These components advantageously use common services that support logging, access control, and data management. ECOMP platform 200 in one embodiment may interface with a managed environment, such as network 15 (FIG. 1A). In one example, a managed environment may include one or more instances of any or all of an IP Core Network, a cloud computing network, a mobility access network, a wireline access network, and/or a satellite television network. Such networks are utilized to provide products and services to customers. ECOMP platform 200 is utilized by a network service provider to manage such managed environments.

Figure 2B:
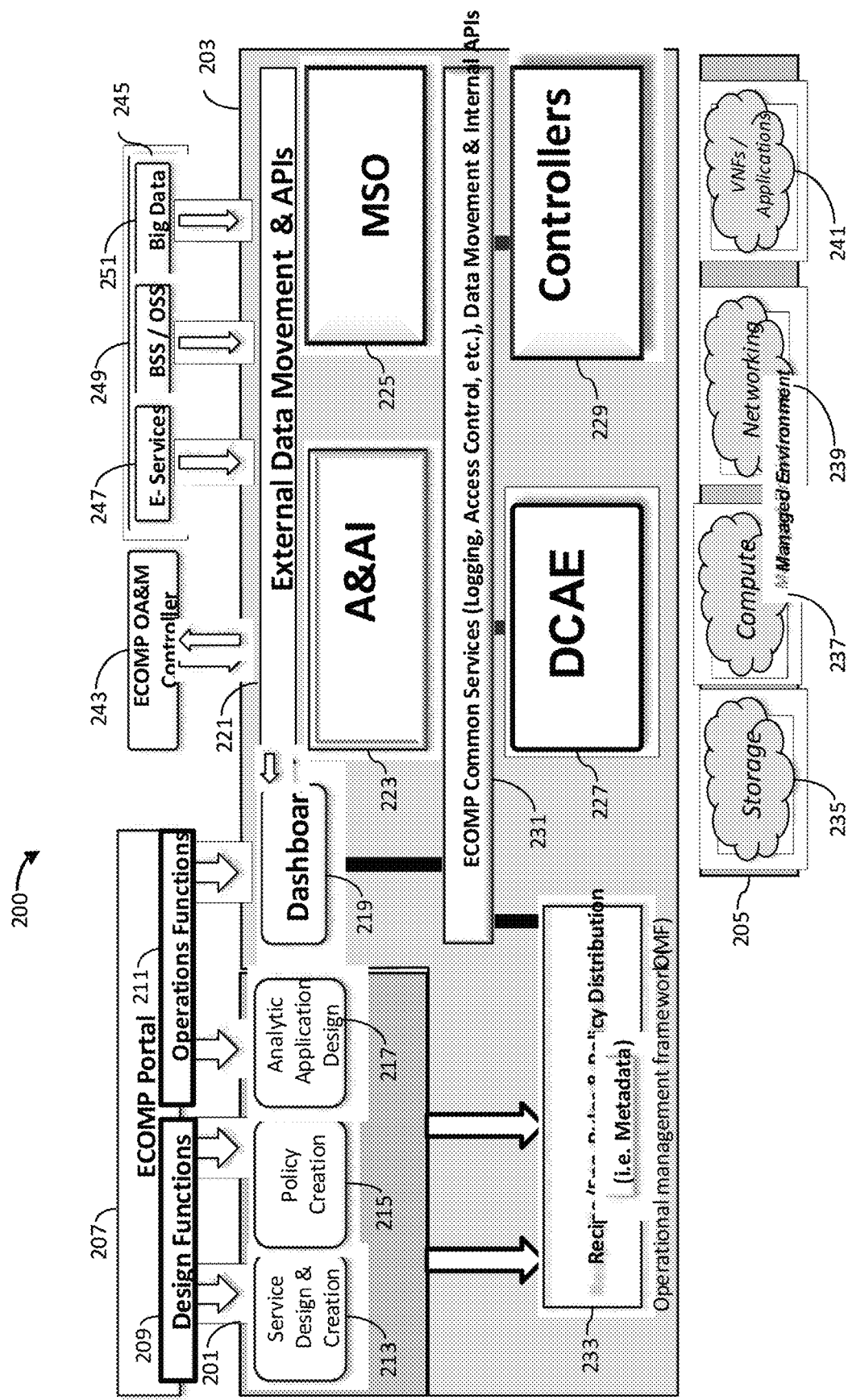
FIG. 2B is an exemplary representation of the ECOMP platform of FIGS. 2A.

Illustrated in FIG. 2B are components of an exemplary embodiment of the ECOMP platform 200. The ECOMP platform 200 is provided with three environments. These are the design creation environment 201, the execution environment 203, and the managed environment 205 shown as shaded areas in FIG. 2A.

The ECOMP platform 200 includes an ECOMP Portal 207 that provides design functions 209 and operations functions 211. The design functions 209 include a service design and creation component 213 and policy creation component 215. The operations functions 211 include analytic application design component 217 and a dashboard 219. The service design and creation component 213, the policy creation component 215 and analytic application design component 217 are all part of the design creation environment 201. The dashboard is part of the execution environment 203.

In addition to the dashboard 219 the execution environment 203 includes: an external data movement and application program interface component, (API component 221); an active and available inventory module, (A&AI module 223); a master service orchestrator, (MSO 225); a data collection, analytics and events component, (DCAE module 227); controllers 229; a common services component 231; and a recipe/engineering rules and policy distribution component 233.

The managed environment 205 provides networking services to users. The managed environment 205 comprises resources, either hardware or software, that may be categorized as: infrastructure resources—(the Cloud resources, e.g., Storage 235, Compute 237); networking resources 239 (network connectivity functions & elements); and VNF/application resources 241 (the features and capabilities of a software application).

Interacting with the execution environment may be an operations, administration and management controller, (OA&M Controller 243); and a number of external applications 245 that may include e-services 247, business support system and operational support systems, (BSS/OSS application 249), and big data services 251 among others.

Additional description regarding the components is disclosed below. The policy creation component 215 deals with policies, which are conditions and requirements, constraints, attributes, or needs that must be provided, maintained, or enforced. At a lower level the policy creation component 215 involves machine-readable rules enabling actions to be taken based on triggers or requests. Policies often consider specific conditions in effect (both in terms of triggering specific policies when conditions are met, and in selecting specific outcomes of the evaluated policies appropriate to the conditions). Policies allow rapid updates through easily updating rules, thus updating technical behavior of components in which those policies are used, without requiring rewrites of their software code. Policies permit simpler management/control of complex mechanisms via abstraction. The policy creation component 215 may include a policy editor; policy rules subcomponent; conflict identification subcomponent; policy storage subcomponent. The policy storage subcomponent may include a library and templates.

The policy creation component 215 has a broad scope supporting infrastructure, product/services, operation automation, and security-related policy rules. These policy rules are defined by multiple stakeholders, (Network/Service Designers, Operations, Security, customers, etc.). In addition, input from various sources (service design and creation component 213, policy editor, customer input, etc.) are collected and rationalized. Therefore, a centralized policy creation environment will be used to validate policies rules, identify and resolve overlaps and conflicts, and derive policies where needed. The policy creation component 215 is accessible, developed and managed as a common asset, and provides editing tools to allow users to easily create or change policy rules. Offline analysis of performance/fault/closed-loop action data are used to identify opportunities to discover new signatures and refine existing signatures and closed loop operations. Policy translation/derivation functionality is also included to derive lower level policies from higher level policies. Conflict detection and mitigation are used to detect and resolve policies that may potentially cause conflicts, prior to distribution. Once validated and free of conflicts, policies are placed in an appropriate repository.

After completing initial policy creation or modification to existing policies, the policy distribution component 233 sends policies (e.g., from the repository) to their points of use, in advance of when they are needed. This distribution is intelligent and precise, such that each distributed policy-enabled function automatically receives only the specific policies which match its needs and scope.

Notifications or events can be used to communicate links/URLs for policies to components needing policies, so that components can utilize those links to fetch particular policies or groups of policies as needed. Components in some cases may also publish events indicating they need new policies, eliciting a response with updated links/URLs. Also, in some cases policies can be given to components indicating they should subscribe to one or more policies, so that they receive updates to those policies automatically as they become available.

The analytic application design component 217 includes an analytics software development kit (SDK), and storage for key performance indicators (KPIs), alarms, operators, etc., as well as storage for analytic application.

The dashboard 219 includes a manual action subcomponent, a reporting subcomponent 403 and a topology visualization subcomponent. The dashboard 219 provides access to design, analytics and operational control/administration functions.

The A&AI module 223 is the component that provides real-time views of the resources, services, products and their relationships. The views provided by the A&AI module 223 relate data managed by multiple ECOMP platforms 100, business support systems and operation support systems, (BSS/OSS application 249), and network applications to form a "top to bottom" view ranging from the products customers buy to the resources that form the raw material for creating the products. A&AI module 223 not only forms a registry of products, services, and resources, it also maintains up-to-date views of the relationships between these inventory items. Active and available inventory submodule 409 will manage these multi-dimensional relationships in real-time. The A&AI module 223 is provided with an inventory management submodule, an entitlements submodule and a resource/service topology submodule.

The inventory and topology data includes resources, service, products, and customer subscriptions, along with topological relationships between them. Relationships captured by A&AI module 223 include "top to bottom" relationships such as those defined in the service design and creation component 213 and when products are composed of services, and services are composed of resources. It also includes "side to side" relationships such as end to end connectivity of virtualized functions to form service chains. A&AI module 223 also keeps track of the span of control of each controller, and is queried by MSO 225 and placement functions to identify which controller to invoke to perform a given operation.

A&AI module 223 is metadata driven, allowing new inventory item types to be added dynamically and quickly via catalog definitions, reducing the need for lengthy development cycles. A&AI module 223 provides the following key requirements:

Provide accurate and timely views of resource, service, and product inventory and their relationship to the customer's subscription;

Deliver topologies and graphs;

Maintain relationships to other key entities (e.g., location) as well as non-integrated cloud environment inventory;

Maintain the state of active, available and assigned inventory within the ECOMP platform 200;

Allow introduction of new types of Resources, Services, and Products without a software development cycle (i.e., be metadata driven);

Be easily accessible and consumable by internal and external clients;

Provide functional APIs that expose invariant services and models to clients;

Provide highly available and reliable functions and APIs capable of operating as generic cloud workloads that can be placed arbitrarily within the cloud infrastructure capable of supporting those workloads;

Scale incrementally as volumes in the ECOMP platform 200 and cloud infrastructure scales;

Perform to the requirements of clients, with quick response times and high throughput;

Enable vendor product and technology swap- outs over time, e.g., migration to a new technology for data storage or migration to a new vendor for MSO 225 or Controllers 229;

Enable dynamic placement functions to determine which workloads are assigned to specific components of the ECOMP platform 200 (i.e., Controllers 229 or VNFs) for optimal performance and utilization efficiency; and Identify the controllers 229 to be used for any particular request.

A&AI module 223 also performs a number of administrative functions. Given the model driven basis of the ECOMP platform 200, metadata models for the various catalog items are stored, updated, applied and versioned dynamically as needed without taking the system down for maintenance. Given the distributed nature of the A&AI module 223 as well as the relationships with other components of the ECOMP platform 200, audits are periodically run to assure that the A&AI module 223 is in sync with the inventory masters such as controllers 229 and MSO 225. Adapters allow the A&AI module 223 to interoperate with non-integrated cloud environment systems as well as 3rd party cloud providers via evolving cloud standards.

Consistent with other applications of the ECOMP platform 200, the A&AI module 223 produces canned and ad-hoc reports, integrates with the dashboard 219, publishes notifications other components of the ECOMP platform 200 can subscribe to, and performs 25 consistent with configurable framework constraints.

The primary function of MSO 225 is the automation of end-to-end service instance provisioning activities. MSO 225 includes a request handler, an orchestration engine, adapters, and service catalog service recipes. MSO provides an interface to orchestrate delivery of integrated cloud environment services. In general, orchestration can be viewed as the definition and execution of workflows or processes to manage the completion of a task. The ability to graphically design and modify a workflow process is the key differentiator between an orchestrated process and a standard compiled set of procedural code. Orchestration provides adaptability and improved time-to-market due to the ease of definition and change without the need for a development engagement. As such, it is a primary driver of flexibility in the architecture. Interoperating with policies, the combination provides a basis for the definition of a flexible process that can be guided by business and technical policies and driven by process designers.

Orchestration exists throughout the integrated cloud environment architecture and is not be limited to the constraints implied by the term "workflow" as it typically implies some degree of human intervention. Orchestration in integrated cloud environment will not involve human intervention/ decision/guidance in the vast majority of cases. The human involvement in orchestration is typically performed up front in the design process although there may be processes that will require intervention or alternate action such as exception or fallout processing.

To support the large number of Orchestration requests, the orchestration engine will be exposed as a reusable service. With this approach, any component of the architecture can execute process recipes. Orchestration services will be capable of consuming a process recipe and executing against it to completion. The Service model maintains consistency and reusability across all orchestration activities and ensures consistent methods, structure and version of the workflow execution environment.

DCAE module 227 includes an analytic applications module, streaming framework, an events pub/sub, real-time collectors, APIs, and batch collector. In the integrated cloud environment virtualized functions across various layers of functionality are expected to be instantiated in a significantly dynamic manner that requires the ability to provide real-time responses to actionable events from virtualized resources, applications, as well as requests from customers, carrier partners and other providers. In order to engineer, plan, bill and assure these dynamic services, DCAE module 227 within the framework of the ECOMP platform 200 gathers key performance, usage, telemetry and events from the dynamic, multi-vendor virtualized infrastructure in order to compute various analytics and respond with appropriate actions based on any observed anomalies or significant events. These significant events include application events that lead to resource scaling, configuration changes, and other activities as well as faults and performance degradations requiring healing. The collected data and computed analytics are stored for persistence as well as use by other applications for business and operations (e.g., billing, ticketing). More importantly, the DCAE module 227 has to perform a lot of these functions in real-time.

DCAE module 227 provides real-time collectors necessary to collect the instrumentation made available in the integrated cloud infrastructure. The scope of the data collection includes all of the physical and virtual elements (compute, storage and network) in the integrated cloud infrastructure. The collection includes the types of events data necessary to monitor the health of the managed environment, the types of data to compute the key performance and capacity indicators necessary for elastic management of the resources, the types of granular data (e.g., flow, session & call records) needed for detecting network & service conditions, etc. The collection will support both real-time streaming as well as batch methods of data collection.

DCAE module 227 needs to support a variety of applications and use cases ranging from real-time applications that have stringent latency requirements to other analytic applications that have a need to process a range of unstructured and structured data. DCAE module 227 needs to support all of these needs and must do so in a way that allows for incorporating new storage technologies as they become available. This may be done by encapsulating data access via APIs and minimizing application knowledge of the specific technology implementations.

Given the scope of requirements around the volume, velocity and variety of data that DCAE module 227 needs to support, the storage may use technologies that Big Data has to offer, such as support for NOSQL technologies, including in-memory repositories, and support for raw, structured, unstructured and semi-structured data. While there may be detailed data retained at the edge layer of DCAE module 227 for detailed analysis and trouble-shooting, applications may optimize the use of bandwidth and storage resources by ensuring they propagate only the required data (reduced, transformed, aggregated, etc.) for other analyses.

The DCAE module 227 includes an analytic framework which is an environment that allows for development of real-time applications (e.g., analytics, anomaly detection, capacity monitoring, congestion monitoring, alarm correlation etc.) as well as other non-real-time applications (e.g., analytics, forwarding synthesized or aggregated or transformed data to Big Data stores and applications); the intent is to structure the environment that allows for agile introduction of applications from various providers (Labs, IT, vendors, etc.). The framework supports the ability to process both a real-time stream of data as well as data collected via traditional batch methods. The analytic framework supports methods that allow developers to compose applications that process data from multiple streams and sources. Analytic applications are developed by various organizations, however, they all run in the DCAE module 227 and are managed by a DCAE controller (not shown). These applications are microservices developed by a broad community and adhere to the standards of the ECOMP platform 200.

The following list provides examples of types of applications that can be built on top of DCAE module 227 and that depend on the timely collection of detailed data and events by DCAE module 227. Analytics applications will be the most common applications that are processing the collected data and deriving interesting metrics or analytics for use by other applications or operations. These analytics range from very simple ones (from a single source of data) that compute usage, utilization, latency, etc. to very complex ones that detect specific conditions based on data collected from various sources. The analytics could be capacity indicators used to adjust resources or could be performance indicators pointing to anomalous conditions requiring response. The Fault/Event Correlation application is a key application that processes events and thresholds published by managed resources or other applications that detect specific conditions. Based on defined rules, policies, known signatures and other knowledge about the network or service behavior, this application would determine root cause for various conditions and notify interested applications and operations.

A performance surveillance and visualization application provides a window to operations notifying them of network and service conditions. The notifications could include outages and impacted services or customers based on various dimensions of interest to Operations. They provide visual aids ranging from geographic dashboards to virtual information model browsers to detailed drilldown to specific service or customer impacts. The capacity planning application provides planners and engineers the ability to adjust forecasts based on observed demands as well as plan specific capacity augments at various levels, e.g., network functions virtualization infrastructure (NFVI) level (technical plant, racks, clusters, etc.), Network level (bandwidth, circuits, etc.), Service or Customer levels. A testing and troubleshooting application provides operations the tools to test and trouble-shoot specific conditions. They could range from simple health checks for testing purposes, to complex service emulations orchestrated for troubleshooting purposes. In both cases, DCAE module 227 provides the ability to collect the results of health checks and tests that are conducted. These checks and tests could be done on an ongoing basis, scheduled or conducted on demand. Some components of integrated cloud environment may expose new targets for security threats. Orchestration and control, decoupled hardware and software, and commodity hardware may be more susceptible to attack than proprietary hardware. However, software defined networks (SDN) and virtual networks also offer an opportunity for collecting a rich set of data for security analytics applications to detect anomalies that signal a security threat, such as distributed denial of service (DDoS) attack, and automatically trigger mitigating action. The applications that are listed above are by no means exhaustive and the open architecture of DCAE module 227 will lend itself to integration of application capabilities over time from various sources and providers.

Figure 2C:
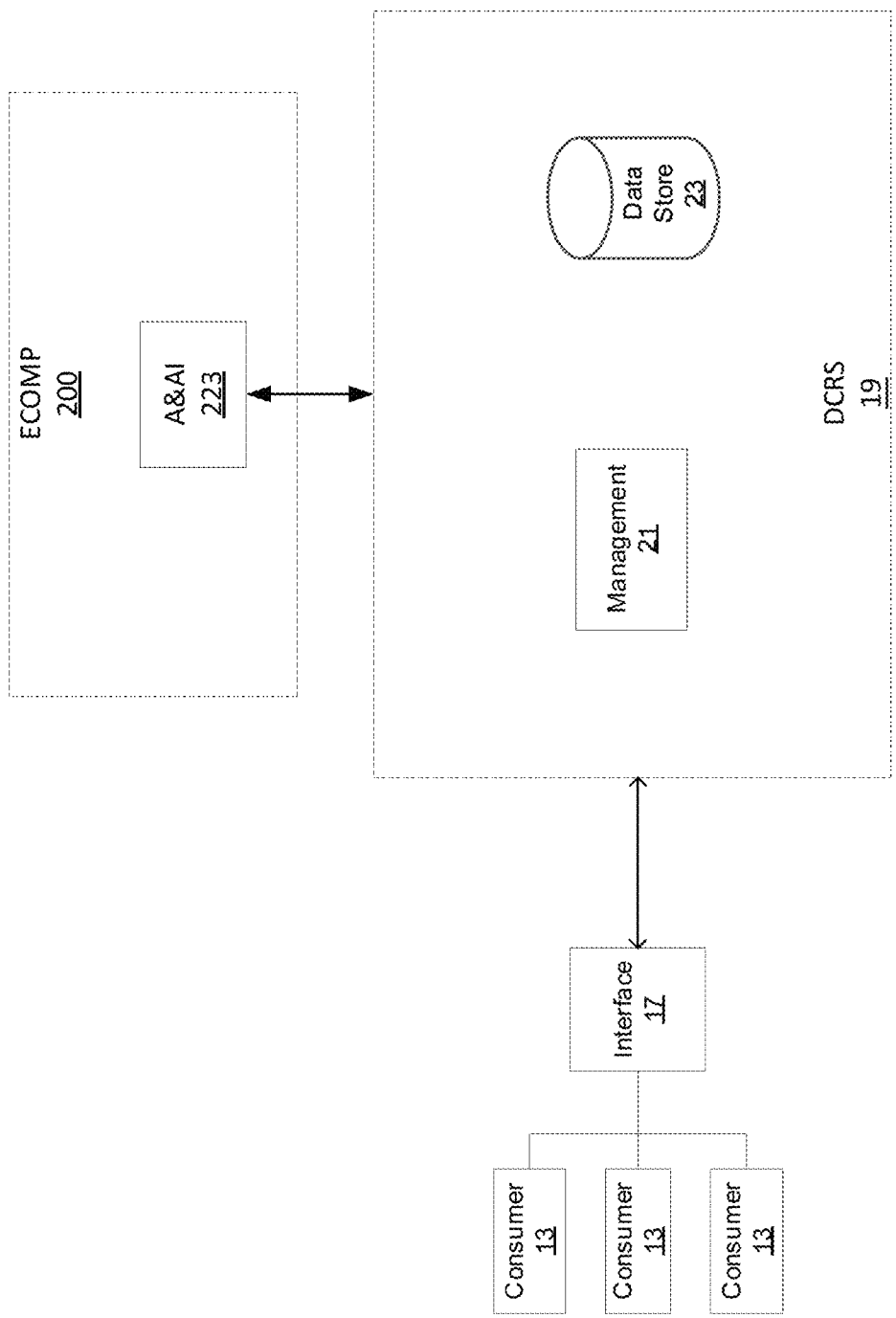
FIG. 2C is a functional block representation of a portion the ECOMP platform of FIG. 2B interacting with the DCRS of FIG. 1A.

Referring now to FIG. 2C, as was mentioned earlier, when working with big data, it is important that the complexity of calls to big data sources and the sheer volume of such calls not degrade overall system performance. This is true when working with ECOMP platform 200 when the performance of a managed network is dependent on how quickly ECOMP can monitor, diagnose, and provide report on network performance. Accordingly, DCRS 19 may be used with ECOMP platform 200 to enhance system performance. In the embodiment shown in FIG. 2C, DCRS 19 interfaces with A&AI 223 module. Thus, A&AI module 223 may be viewed in the embodiment shown as data source 11 of FIG. 1A. A&AI module 223 is the component that provides real-time views of the resources, services, products and their relationships of a managed network. A&AI module 223 may provide canned, ad hoc, and real-time reporting of such resources, products, and reporting. DCRS 19 may be utilized to make data retrieval more efficient from A&AI module 223. However, because A&AI module 223 provides both canned and real time reports, not all data within DCRS is treated the same. Some data is stored and updated at different frequencies and in different ways than other data.

Referring now to FIG. 2C, in one example, a consumer 13 executing a call to retrieve data from A&AI module 223 could retrieve data directly from ECOMP 200. However, to enhance the speed of data retrieval, DCRS 19 is utilized to store static responses that would mirror what would be returned on a direct API call from consumer 13 to ECOMP. In one example, these static responses are stored as JavaScript Object Notation (JSON) responses in data store 23, which, as was previously discussed, may be configured as cache memory. Because such retrieval would not require the running of API logic when retrieved, data retrieval speed would be enhanced.

The updating of data store 23 may be updated in different ways. In one example, management component 21 may utilize a machine learning layer that would auto-define data store 23 population configurations through analyzing the call traffic to data source 11 for volume and repetitiveness of calls and dynamically configuring what is stored. For instance, management component 21 may realize that certain processes are calling certain types of data from data store at an increasing frequency. Management component 21 may set a threshold at which it will begin to update data store 23 for these types of data at an increasing frequency. In another example, if calls for certain types of data dropped below a threshold, management component 21 may update data store at a lower frequency. In another example, management component 21 may elect to continuously update data store 23. For instance, management component 21 may determine that the volume and/or frequency of requests for certain data is so large that continuous updates are worthwhile. In another example, management component 21 may determine that the type of data being requested is "mission critical" and elect to update data on state store 23 in real time regardless of volume or frequency. In another example, management component 21 may update data on data store 23 at a lower frequency because it is less mission critical. In another example, management component 21 may update data on data store based on a combination of frequency of requests, volume of requests, and/or mission criticality.

As an example, management component 21 may update data store 23 in response to processing events. For instance, records of certain processing events that occur on ECOMP 200 may be automatically updated in data store 23. In one example, notifications of such events may be sent directly to DCRS 19. For instance, when near real time updates are needed and performance is a concern, then data store 23 may be updated through Data Movement as a Platform (DMaaP) updates, such as those retrieved from an AAI Event Topic interface.

In another example, management component 21 may update data store 23 in response to an update request. For instance, an administrator or administrative function may request an update of data store 23 in response to a force update request. In another example, if an end user is willing to sacrifice real-time data for performance, but wants to maintain data store 23, then a forced update may be used. In another example, data store 23 may be updated at scheduled intervals. In another example, if an end user is willing to sacrifice real-time data for performance, data store 23 may be updated at a provided interval—this is an appropriate configuration for applications, such as canned reporting.

It should be noted that the present disclosure is not limited to updating data store 23 in its entirety each time it is updated, although that is a possibility. Data store 23 may be partitioned and certain partitions may be updated while others or not. In addition, certain types of data within partitions may be updated while others are not.

A description of exemplary cache key configurations and end point configurations for data store 23 will now be provided for illustrative purposes. In one embodiment, a cache key configuration may be implemented by management component 21. In one example, a cache key configuration may define on or more parameters, such as where to pull the cache (uri to call), how to pull the cache (http method/body), how to update the cache, (e.g. by processing dmaap events, timed syncs, or force syncs), the last time the cache was synced, the last time the cache sync was successful, and the last time the cache sync ended.

Exemplary terminology for implementation of such cache key configuration is shown below:

---

_id -- the unique identifier used to track the cache
baseUrl - the first part of the uri used to populate the cache ie. the highlighted section in the following https://localhost:8444/aai/v13/cloud-infrastructure/pservers?depth=5807c3c3-92cd-44d7-a508-8539cd36ecda
module - (defaults to −1) - the middle of the uri used to populate the cache ie. the highlighted section in the following https://localhost:8444/aai/v13/cloud-infrastructure/pservers?depth=5807c3c3-92cd-44d7-a508-8539cd36ecda
URI - the end of the uri used to populate the cache ie. the highlighted section in the following https://localhost:8444/aai/v13/cloud-infrastructure/pservers?depth=5807c3c3-92cd-44d7-a508-8539cd36ecda
timingIndicator - (defaults to firstHit) - defines when the cache is triggered, values include, onInit, firstHit, or scheduled
onInit - when the cache key is added to the cache key configuration, the corresponding cache is populated
firstHit - the associated cache is not populated until the first time the cache is requested
scheduled - the associated cache is updated periodically dependent on the minute interval defined for syncInterval
syncInterval - (defaults to 1440 which is daily in minutes if timingIndicator is scheduled) - the interval (in minutes) to populate the associated cache.
lastSyncStart - generated by mS (initialized as −1) - timestamp stored for the last sync start time of the associated cache, format is YYYY-MM-DDHH:MM:SS.MMM-TZ
lastSyncSuccessTime - generated by mS (initialized as −1) - timestamp stored for the last sync success time of the associated cache, format is YYYY-MM-DDHH: MM:SS.MMM-TZ
lastSyncEndTime - generated by mS (initialized as −1) - timestamp stored for the last sync end time of the associated cache, format is YYYY-MM-DDHH:MM:SS.MMM-TZ
httpMethod - optional - defaults to GET - defines the http method to be used by the cacher to retrieve the cache, currently only GET is supported
httpBody - optional (required if httpMethod is PUT/POST/DELETE but not used in first iteration of Cacher, defaults to −1) - this will define the payload to be used for calls using needing to send a payload
parserStrategy - optional (defaults to none) - current values accepted are none & aai-resource-get-all, for none the associated cache is not updated by dmaap and would rely on periodic syncs to stay up to date, for aai-resource-get-all the associated cache is updated via dmaap

---

Below is an example of a cloud-region cache key that defines a cache populating mechanism to trigger immediately and be managed by DMaaP events:

| (1) cloud-region | {12 fields} |
|---|---|
| ..id | cloud-region |
| baseUrl | https://aai-uint2.test.att.com8443 |
| module | /aai/v13/ |
| URI | cloud-infrastructure/cloud-regions?depth=0&resultIncex=1&resultSize=3 |
| timingIndicator | onInit |
| syncInterval | −1 |
| lastSyncStartTime | 2018-06-1311:9:30.911-0400 |
| lastSyncSuccessTime | 2018-06-1311:9:32.787-0400 |
| lastSyncEndTime | 2018-06-1311:9:32.787-0400 |
| httpBody | −1 |
| httpMethod | GET |
| parserStrategy | aai-resource-get-all |

Below is an example of a cache key that defines a cache populating mechanism to trigger a cache sync every minute (if not already executing).

| (6) pserverScheduled | {12 fields} | Object |
|---|---|---|
| _id | pserverScheduled | String |
| baseUrl | https://aai-uint2.test.att.com8443 | String |
| module | /aai/v13/ | String |
| URI | cloud-infrastructure/pservers?depth=5807c3c3-92cd-44d7-a... | String |
| timingIndicator | scheduled | String |
| syncInterval | 1 | String |
| lastSyncStartTime | 2018-06-1311:22:19.062-0400 | String |
| lastSyncSuccessTime | 2018-06-1311:22:23.107-0400 | String |
| lastSyncEndTime | 2018-06-1311:22:23.107-0400 | String |
| httpBody | −1 | String |
| httpMethod | GET | String |
| parserStrategy | none | String |

Below is an example of a generic-vnf cache key that defines a cache populating mechanism to trigger a cache sync on the first get called to the cache (first end user would incur the cost of the call).

| (4) generic-vnf | {12 fields} | Object |
|---|---|---|
| _id | generic-vnf | String |
| baseUrl | https://aai-uint2.test.att.com8443 | String |
| module | /aai/v13/ | String |
| URI | network/generic-vnfs?depth=5807c3c3-92cd-44d7-a508-853... | String |
| timingIndicator | firstHit | String |
| syncInterval | −1 | String |
| lastSyncStartTime | −1 | String |
| lastSyncSuccessTime | −1 | String |
| lastSyncEndTime | −1 | String |
| httpBody | −1 | String |
| httpMethod | GET | String |
| parserStrategy | none | String |

Below are examples of cache key endpoints:

PUT https://{host}:8444/aai/cacheKey/v1/add
Accepts a json representation of a cache key object to add the cache key configuration
PUT https://{host}:8444/aai/cacheKey/v1/update
Accepts a json representation of a cache key object, for the fields that need to be updated
GET https://{host}:8444/aai/cacheKey/v1/get
If no cacheKey is passed as a query parameter then all configurations will be returned
If a cacheKey is passed as a query parameter the configuration would be returned if available
DELETE https://{host}:8444/aai/cacheKey/v1/delete
Requires a cacheKey passed in its payload, to delete the cache key configuration and associated cache Below are exemplary implementations of cache endpoints:

```
GET https://{host}:8444/aai/cache/v1/get
Accepts a cacheKey parameter, to return the cached response
If the cached response is not available for the given cache key, the cache will be
populated on the fly and returned
PUT https://{host}:8444/aai/cache/v1/sync
Accepts cacheKey in its payload to sync the populated cache
DELETE https://{host}:8444/aai/cache/v1/delete
Accepts cacheKey in its payload to delete the populated cache
```

Figure 3:
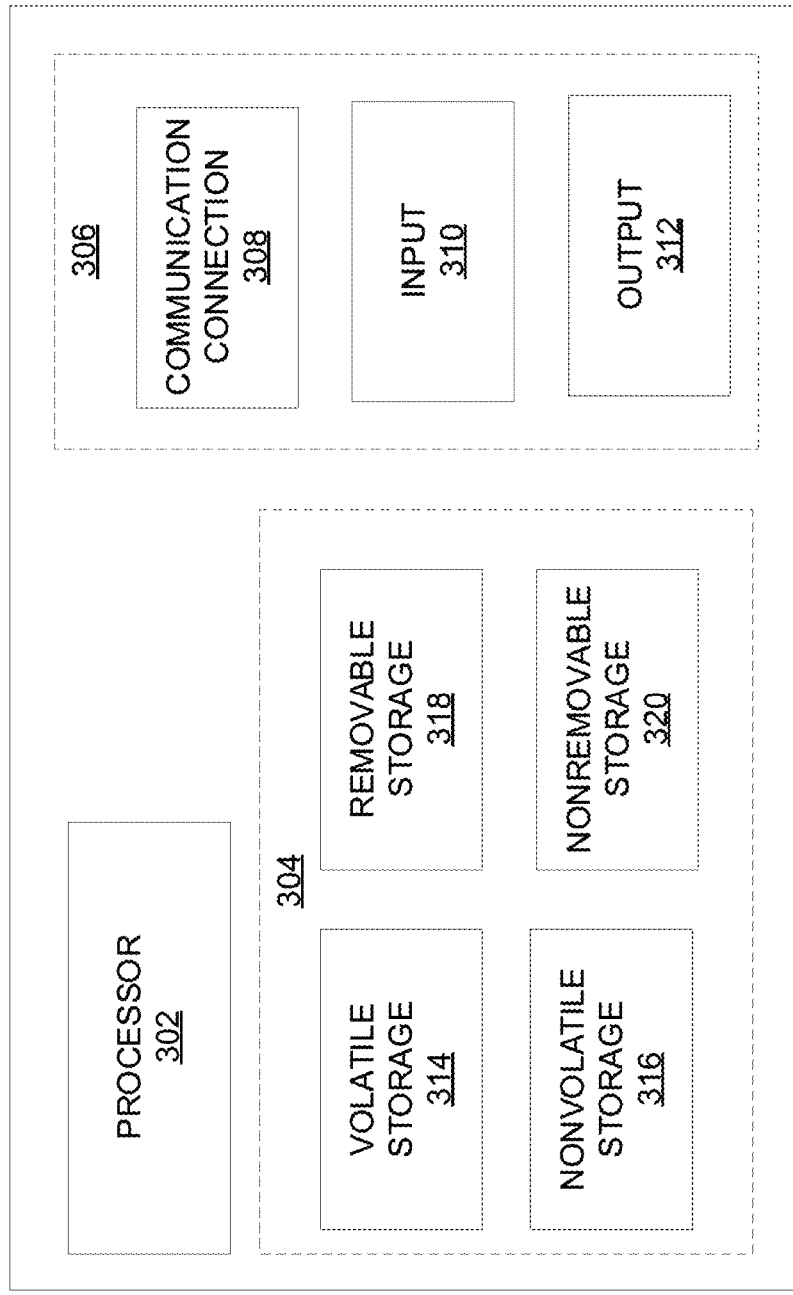
FIG. 3 is a representation of a network device according to an example.

Referring to FIG. 3, DCRS 19 may be implemented on a network device, an example of which is illustrated in FIG. 3 as a functional block diagram. Network device 300 may comprise a processor 302 and a memory 304 coupled to processor 302. Memory 304 may contain executable instructions that, when executed by processor 302, cause processor 302 to effectuate operations associated with translating parallel protocols between end points in families as described above. As evident from the description herein, network device 300 is not to be construed as software per se.

In addition to processor 302 and memory 304, network device 300 may include an input/output system 306. Processor 302, memory 304, and input/output system 306 may be coupled together to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), electrical means, or a combination thereof. In an example configuration, input/output system 306 may comprise a Wi-Fi finder, a two-way GPS chipset or equivalent, or the like, or a combination thereof. Bluetooth, infrared, NFC, and Zigbee are generally considered short range (e.g., few centimeters to 20 meters). WiFi is considered medium range (e.g., approximately 100 meters).

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 4:
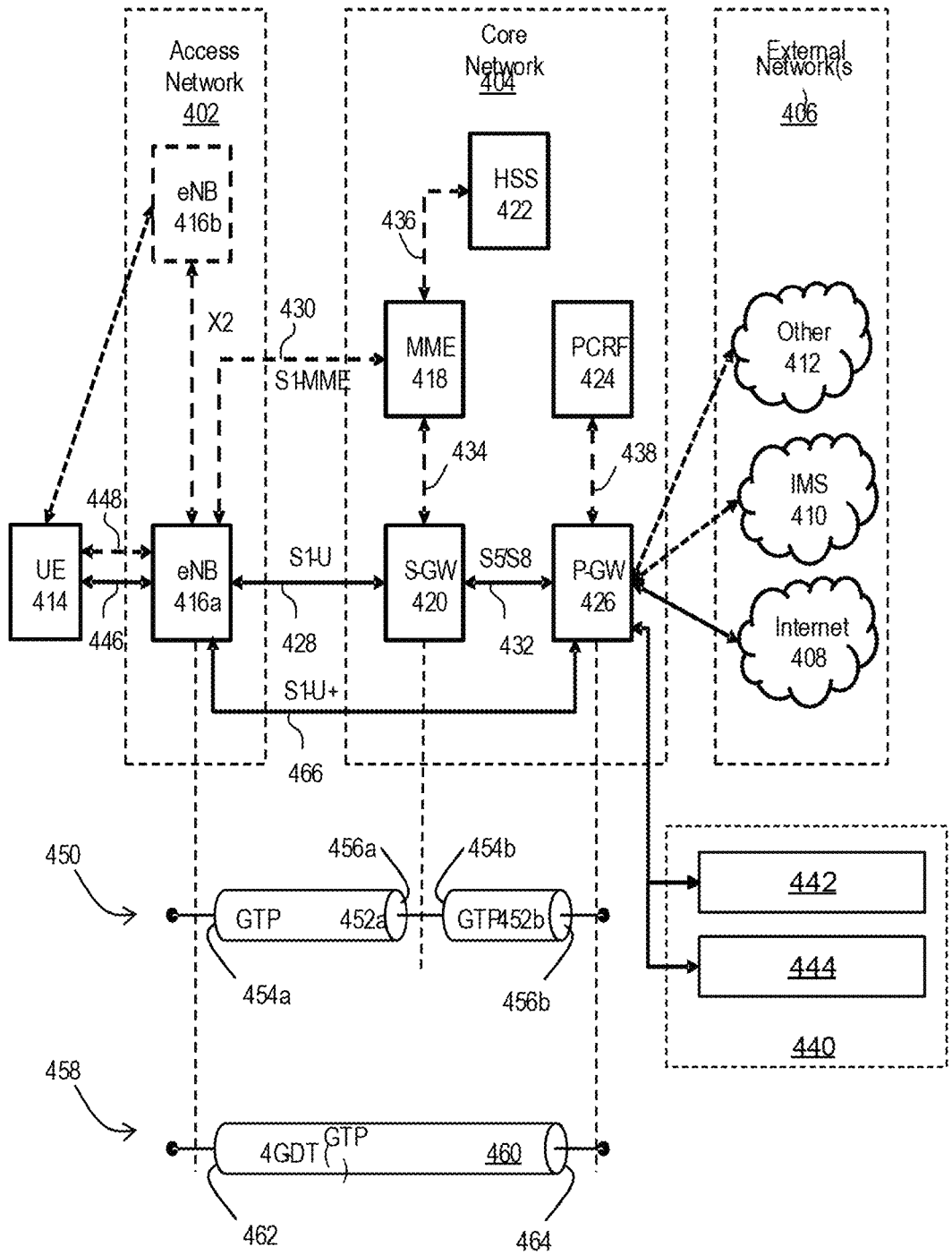
FIG. 4 depicts an exemplary communication system that provides wireless telecommunication services over wireless communication networks that may be at least partially virtualized.

FIG. 4 illustrates a functional block diagram depicting one example of an LTE-EPS network architecture 400 that may be at least partially implemented as an SDN. In one example, managed environment 105 may comprise all or a portion of network architecture 400. Network architecture 400 disclosed herein is referred to as a modified LTE-EPS architecture 400 to distinguish it from a traditional LTE-EPS architecture. It should be noted that the network architecture is provided for illustrative purposes. The functionality described above is network independent and can be applied to other wired and/or wireless networks.

An example modified LTE-EPS architecture 400 is based at least in part on standards developed by the 3rd Generation Partnership Project (3GPP), with information available at www.3gpp.org. LTE-EPS network architecture 400 may include an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an interne protocol (IP) network 408, an IP multimedia subsystem (IMS) network 410, and other networks 412, such as a service network, a corporate network, or the like. In an aspect, access network 402, core network 404, or external network 405 may include or communicate with network 100.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416a, 416b. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416a.

HSS 422 can manage subscription-related information for a user of UE 414. For example, tHSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+interface 466. In the illustrative example, the S1-U+user plane interface extends between the eNB 416*a* and PGW 426. Notably, S1-U+path/interface does not include SGW 420, a node that is otherwise instrumental in configuring and/or managing packet forwarding between eNB 416*a* and one or more external networks 406 by way of PGW 426. As disclosed herein, the S1-U+path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 4. In other words, either or both of access network 402 and the core network 404 can include additional network elements that are not shown, such as various routers, switches and controllers. In addition, although FIG. 4 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416*a,* SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416*a,* a second portion (e.g., an S1 data bearer 428 ) between eNB 416*a* and SGW 420, and a third portion (e.g., an S5/S8 bearer 432) between SGW 420 and PGW 426. Various signaling bearer portions are also illustrated in FIG. 4. For example, a first signaling portion (e.g., a signaling radio bearer 448) between UE 414 and eNB 416*a,* and a second signaling portion (e.g., S1 signaling bearer 430) between eNB 416*a* and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 100, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between eNB 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some embodiments, first tunnel solution 450 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. That is, SGW 420 can serve a relay function, by relaying packets between two tunnel endpoints 416a, 426. In other scenarios, direct tunneling solution 458 can forward user data packets between eNB 416a and PGW 426, by way of the S1 U+interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual bases. That is, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416a. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 5:
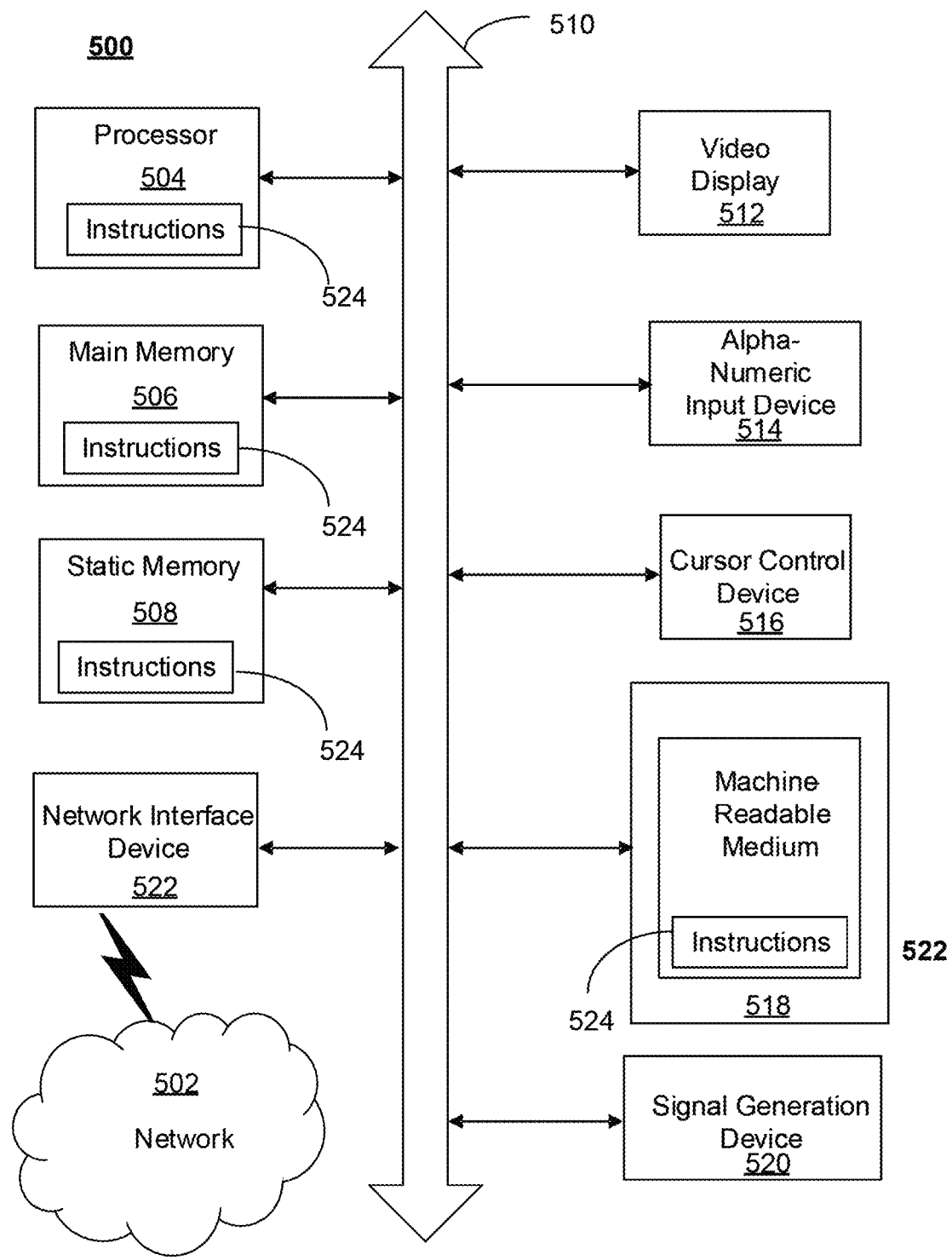
FIG. 5 depicts an exemplary diagrammatic representation of a machine in the form of a computer system.

FIG. 5 depicts an exemplary diagrammatic representation of a machine in the form of a computer system 500 within which a set of instructions, when executed, may cause the machine to perform any one or more of the methods described herein. One or more instances of the machine can operate, for example, as processor 302, UE 414, eNB 416, MME 418, SGW 420, HSS 422, PCRF 424, PGW 426 and other devices of FIGS. 1, 2, and 4. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

While examples of systems and methods for management of virtualized devices have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

The invention claimed is:

1. A storage system configured to store data, from a data source, which is responsive to one or more requests from at least one data consumer, comprising:
   a data store that is configured to cache at least some data from the data source, wherein the data store comprises at least one portion of a service design and creation platform attached to a managed network; and
   a data management component that is configured to cause the at least some data to be stored in the data store based on at least one criteria of the at least one data consumer, wherein the data management component comprises a processing system including a processor, an input/output device coupled to the processing system, and a memory that stores executable instructions that, when executed by the processing system, facilitate performance of operations, the operations comprising:
      identifying the at least one criteria based on the one or more requests, wherein the at least one criteria comprise an update frequency parameter for the data;
      storing the at least some data from the data source in the data store to obtain stored data in response to the identifying the at least one criteria, wherein the stored data is returned to the at least one data consumer, responsive to an application program interface (API) request for the at least some data, without a running of API logic, wherein the API request comprises a direct call to the service design and creation platform from the at least one data consumer; and
      updating the data store, in response to a processing event or update request, using a machine learning layer to auto-define population configurations of the data store.

2. The storage system of claim 1, wherein the data store comprises at least one cache memory device that stores one or more java script objection notation (JSON) responses that mirror the at least some data from the data store.

3. The storage system of claim 2, wherein the one or more JSON responses are selected by the data management component for inclusion in the data store.

4. The storage system of claim 1, wherein the data management component determines the update frequency parameter based upon at least one of time sensitivity of the at least some data and accuracy of the at least some data.

5. The storage system of claim 4, wherein the data management component determines the update frequency parameter through analyzing the one or more requests from the at least one data consumer.

6. The storage system of claim 4, wherein the data management component determines the update frequency parameter through receipt of instructions from the at least one data consumer.

7. The storage system of claim 1, wherein the service design and creation platform comprises an enhanced control, orchestration, management, and policy (ECOMP) platform.

8. The storage system of claim 7, wherein the at least one portion comprises an active and available inventory module.

9. The storage system of claim 8, wherein the data store is updated through utilization of one or more Data Movement as a Platform (DMaaP) updates.

10. A method to store data, from a data source, which is responsive to one or more requests from at least one data consumer, comprising:
    receiving, by a processing system including a processor, at least some data from the data source; and
    employing, by the processing system, a data management component, which is configured to cause the at least some data to be stored in a data store based on at least one criteria of the at least one data consumer, to:
       identify the at least one criteria based on the one or more requests, wherein the at least one criteria comprise an update frequency parameter for the data;
       cache the at least some data from the data source in the data store to obtain stored data in response to the identifying the at least one criteria, wherein the stored data is returned to the at least one data consumer, responsive to an application program interface (API) request for the at least some data, without a running of API logic, wherein the data store comprises at least one portion of a service design and creation platform attached to a managed network, and wherein the API request comprises a direct call to the service design and creation platform from the at least one data consumer; and
       update the data store, in response to a processing event or update request, using a machine learning layer to auto-define population configurations of the data store.

11. The method of claim 10, wherein the data store comprises at least one cache memory device that stores one or more java script objection notation (JSON) responses that mirror the at least some data from the data store.

12. The method of claim 11, wherein the one or more JSON responses are selected by the data management component for inclusion in the data store.

13. The method of claim 10, wherein the data management component determines the update frequency parameter based upon at least one of time sensitivity of the at least some data and accuracy of the at least some data.

14. The method of claim 13, wherein the data management component determines the update frequency parameter through analyzing the one or more requests from the at least one data consumer.

15. The method of claim 13, wherein the data management component determines the update frequency parameter through receipt of instructions from the at least one data consumer.

16. The method of claim 10, wherein the service design and creation platform comprises an enhanced control, orchestration, management, and policy (ECOMP) platform.

17. The method of claim 16, wherein the at least one portion comprises an active and available inventory module.

18. The method of claim 17, wherein the data store is updated through utilization of one or more Data Movement as a Platform (DMaaP) updates.

19. The method of claim 10, wherein the service design and creation platform further comprises a metadata-driven service design and creation platform adapted to facilitate a rapid on-boarding of new services.

20. The storage system of claim 1, wherein the service design and creation platform further comprises a real-time, operational management framework that provides real-time, policy driven automation of management functions.

\* \* \* \* \*